DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 8

T883,002

ELECTROLYTIC RECORDING MEDIUM

Derek D. Chapman and Dorothy J. Beavers, Rochester, N.Y. (both of Kodak Park Works, Rochester, N.Y. 14650)

Filed July 22, 1969, Ser. No. 843,808
Int. Cl. B21h *1/20*
U.S. Cl. 204—2
No Drawing. 13 Pages Specification

This invention relates to an improved electrolytic recording medium including an electrically conducting support having a hydrophilic surface into which is imbibed an electrosensitive agent, the improvement being that the hydrophilic surface is a hydrophilic colloid layer such as gelatin in which is dispersed a pigment such as barium sulfate. The pigment is dispersed in the hydrophilic colloid in an amount of from, for example, 3 to 12 parts by weight per part of hydrophilic colloid. This inclusion of a hydrophilic colloid surface layer having a pigment dispersed therein promotes image sharpness, fosters image dimensional stability over a period of time and contributes to the preservation of the initial image density.